(12) United States Patent
Stout, II et al.

(10) Patent No.: US 12,370,933 B2
(45) Date of Patent: Jul. 29, 2025

(54) MOVABLE ARM FOR IN-VEHICLE SUPPORT SURFACE

(71) Applicant: FCA US LLC, Auburn Hills, MI (US)

(72) Inventors: Mark E Stout, II, Waterford, MI (US); Brandon Brady, Lapeer, MI (US); Benjamin Treinen, Birmingham, MI (US)

( * ) Notice: Subject to any disclaimer, the term of this patent is extended or adjusted under 35 U.S.C. 154(b) by 267 days.

(21) Appl. No.: 18/171,701

(22) Filed: Feb. 21, 2023

(65) Prior Publication Data
US 2024/0278701 A1    Aug. 22, 2024

(51) Int. Cl.
*B60N 2/75*      (2018.01)
*B60N 3/00*      (2006.01)

(52) U.S. Cl.
CPC ............... *B60N 2/79* (2018.02); *B60N 3/002* (2013.01)

(58) Field of Classification Search
CPC .................................. B60N 2/79; B60N 3/002
USPC ...................................................... 297/145
See application file for complete search history.

(56) References Cited

U.S. PATENT DOCUMENTS

| | | | |
|---|---|---|---|
| 7,311,354 B2 * | 12/2007 | Giasson | B64D 11/064 |
| | | | 297/145 |
| 10,457,170 B2 | 10/2019 | Line et al. | |
| 2010/0244478 A1 * | 9/2010 | DePue | B60N 2/773 |
| | | | 296/37.8 |

FOREIGN PATENT DOCUMENTS

| | | | | |
|---|---|---|---|---|
| DE | 102005048144 A1 * | 4/2007 | ............ | B60N 2/468 |
| DE | 102019120974 A1 * | 2/2021 | | |
| DE | 102021213254 A1 * | 5/2023 | ............ | B60N 3/002 |

* cited by examiner

*Primary Examiner* — Milton Nelson, Jr.
(74) *Attorney, Agent, or Firm* — Jeremy J. Klobucar

(57) ABSTRACT

An assembly for a vehicle interior, includes a track and an arm. The track has a base with a front end and a rear end spaced from the front end in a first direction, the track also has a carriage coupled to the base for movement of the carriage relative to the base in the first direction. The arm is coupled to the carriage so that the arm and carriage move together relative to the base. The arm also is coupled to the carriage for rotation of the arm relative to the carriage about a pivot axis to position the arm at an angle to the first direction of at least 75 degrees, and the arm includes a first part coupled to a second part so that the first part is movable relative to the second part to increase a surface area of the arm.

19 Claims, 4 Drawing Sheets

MOVABLE ARM FOR IN-VEHICLE SUPPORT SURFACE

FIELD

The present disclosure relates to a movable arm for an in-vehicle support surface that may be used to support items readily accessible to a vehicle passenger.

BACKGROUND

Sometimes vehicle occupants need horizontal surfaces on which they can put items, such as a note pad, food or drink, a laptop computer or the like. Center consoles of vehicles sometimes provide a useable surface but require someone sitting in a seat to the side of the counsel to twist their body and lean toward the counsel in order to access items thereon. Such movements are uncomfortable and inconvenient for the user.

SUMMARY

In at least some implementations, an assembly for a vehicle interior, includes a track and an arm. The track has a base with a front end and a rear end spaced from the front end in a first direction, the track also has a carriage coupled to the base for movement of the carriage relative to the base in the first direction. The arm is coupled to the carriage so that the arm and carriage move together relative to the base. The arm also is coupled to the carriage for rotation of the arm relative to the carriage about a pivot axis to position the arm at an angle to the first direction of at least 75 degrees, and the arm includes a first part coupled to a second part so that the first part is movable relative to the second part to increase a surface area of the arm.

In at least some implementations, the arm has a front end and a rear end and the arm is coupled to the carriage adjacent to the front end so that the arm rotates about the front end and the rear end of the arm rotates away from the carriage.

In at least some implementations, the arm includes a front end and a rear end and opposite sides that extend between the front end and the rear end, and wherein the first part is attached to the second part along one of the sides to permit pivoted movement of the first part relative to the second part. In at least some implementations, the second part is coupled to the carriage and the first part is directly coupled to the second part but is not directly coupled to the carriage. In at least some implementations, the second part rotates between folded and unfolded positions relative to the first part and wherein, in the folded position, an inner surface of the second part overlaps and is parallel to an inner surface of the first part, and in the unfolded position, the inner surface of the second part does not overlap the inner surface of the first part. In at least some implementations, in the unfolded position, the second part may be rotated relative to the first part between 90 and 180 degrees from the folded position.

In at least some implementations, the base is inclined relative to the first direction in a second direction, and wherein the carriage and arm move in the second direction as the carriage and arm move relative to the base in the first direction.

In at least some implementations, the arm rotates relative to the carriage about the pivot axis to position the arm at an angle to the first direction of at least 90 degrees.

In at least some implementations, a vehicle includes a first seat including a seat bottom having a width in a cross-car direction and a length in a fore-aft direction that is perpendicular to the cross-car direction, a console located adjacent to the first seat in the cross-car direction, a first track coupled to the console, and a first arm coupled to the first track. The first arm is slidably movable in the fore-aft direction relative to at least part of the first track, the first arm is pivotably movable to an outward position relative to at least part of the first track about a first axis perpendicular to the fore-aft direction and the cross-car direction so that the first arm extends across at least half the width of the seat bottom.

In at least some implementations, the first track is inclined in a vertical direction that is perpendicular to the cross-car direction and the fore-aft direction, and the first arm moves in the vertical direction when the first arm moves in the fore-aft direction. In at least some implementations, the first seat includes a seat back extending vertically beyond the seat bottom at a rear end of the seat bottom, and the seat bottom includes a front end spaced from the rear end in the fore-aft direction, and as the first arm moves in the fore-aft direction away from the rear end of the seat bottom, the first arm is raised vertically to increase the vertical distance between a bottom surface of the first arm and an upper surface of the seat bottom.

In at least some implementations, the arm includes a front end and a rear end, the front end and rear end being aligned in the fore-aft direction in at least one position of the first arm, and the first arm is coupled to the first track at or adjacent to the front end of the first arm, and when the first arm rotates about the first axis, the rear end of the arm rotates away from the first track and overlaps the seat bottom of the first seat. In at least some implementations, in the outward position, at least a portion of a side of the first arm between the front end of the first arm and the rear end of the first arm is parallel to or within 15 degrees of parallel to the cross-car direction.

In at least some implementations, the first arm includes a lower part coupled to the track and an upper part coupled to the lower part, and the upper part is movable relative to the lower part along a second axis that is perpendicular to the first axis. In at least some implementations, the second axis is oriented in the cross-car direction or within 15 degrees of the cross-car direction when the first arm is in the outward position.

In at least some implementations, the vehicle also includes a second seat arranged so that the console is between the first seat and second seat in the cross-car direction, a second track coupled to the console, and a second arm coupled to the second track. The second arm is slidably movable in the fore-aft direction relative to at least part of the second track, the second arm is pivotably movable to an outward position relative to at least part of the second track about a second axis perpendicular to the fore-aft direction and the cross-car direction so that a side of the second arm is at an angle of at least 75 degrees relative to the fore-aft direction. And in the outward position of the second arm, the second arm extends across at least half the width of the second seat.

In at least some implementations, the first arm rotates about the first axis in a first direction to the outward position of the first arm, and the second arm rotates about the second axis in a second direction to the outward position of the second arm.

A vehicle may have a console with movable arms. The arms may move fore-aft, may pivot about a vertical axis to an outward position in which the arms overlie the seat bottom of an adjacent seat, and the arms may unfold to provide an increased surface area to act as a table or similar working area to support objects. The arm may pivot outward to overlie half or more of the width of the seat bottom of an adjacent seat, and the arm may pivot outward to an angle of 75 degrees or more relative to the fore-aft direction, to position the arm in front of an occupant of the seat and make use of the arm as a support surface or table convenient and comfortable for a user.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 6 is a bottom view of an arm and track to which the arm is mounted, showing the arm in the advanced and folded position;

DETAILED DESCRIPTION

Figure 1:
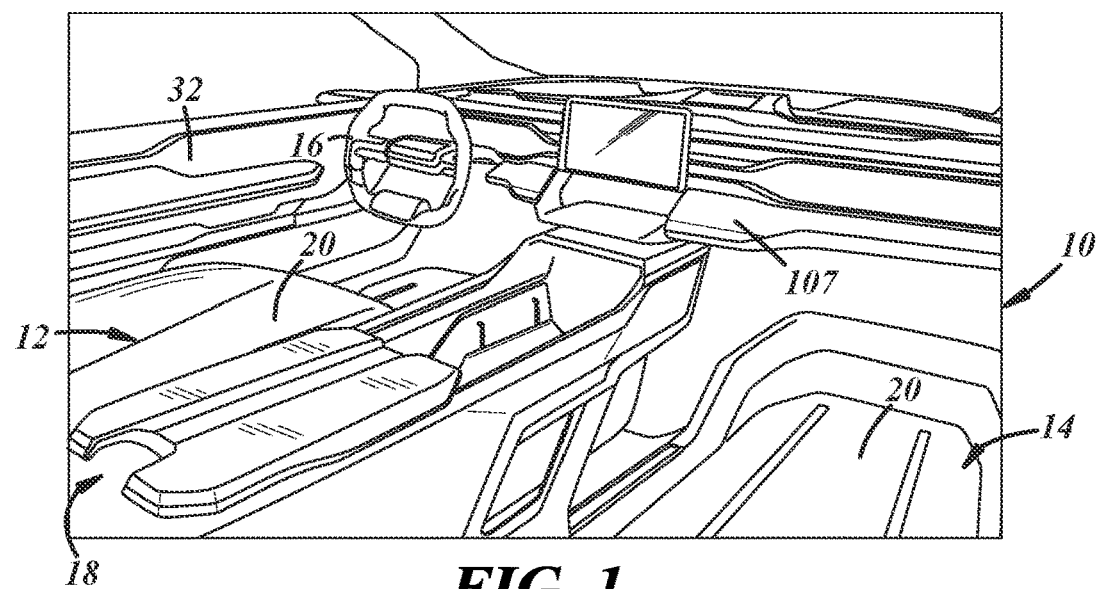
FIG. 1 is a perspective view of a part of a vehicle interior showing two seats and a console between the seats, with arms of the console in a retracted and folded position.

Referring in more detail to the drawings, FIGS. 1, 2, 4, 7 and 9 illustrate part of a vehicle interior 10 or passenger compartment, shown as including two front seats 12, 14 (commonly referred to as a driver's seat 12 with a steering wheel 16 (FIG. 1) or other steering input in front of the driver seat 12, and a front passenger's seat 14 to the side of the driver's seat 12) and a console 18 between the seats 12, 14. In this disclosure: 1) the direction between the front end and a rear end of the vehicle is called the fore-aft direction; 2) the direction between opposite sides of the vehicle, e.g. left and right sides, is called the cross-car direction; and 3) the direction between a floor and roof of the vehicle is called the vertical direction.

Figure 2:
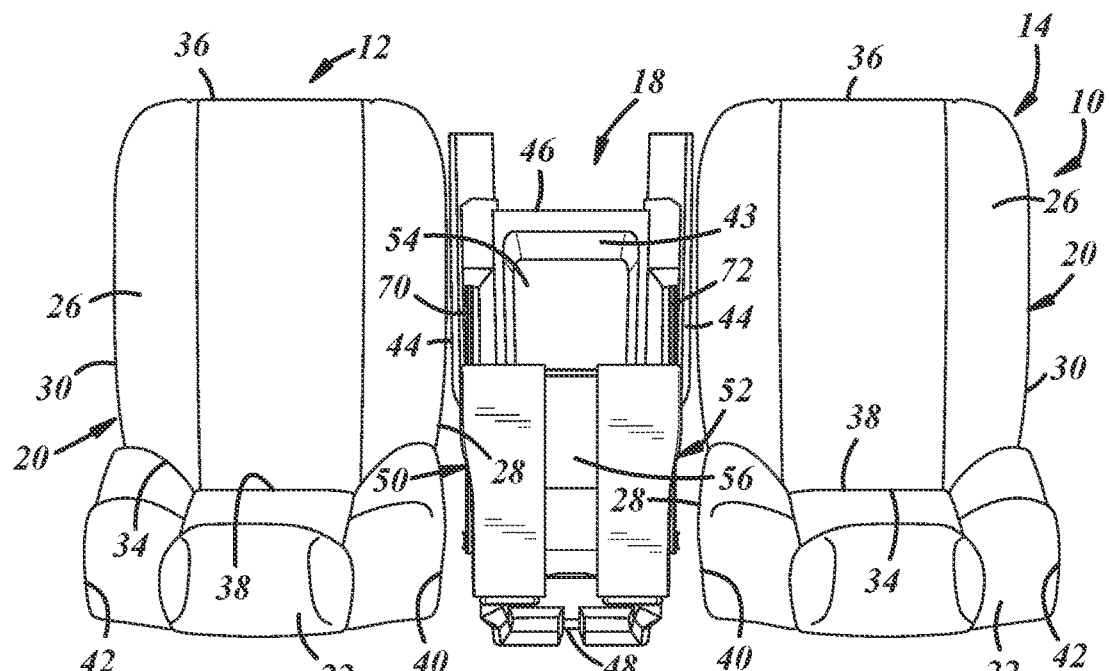
FIG. 2 is a top view showing the seats and console with the arms in the retracted and folded position.

As shown in FIG. 2, the seats 12, 14 may have a seat bottom 20 and a seat back 22 extending generally vertically at a desired and optionally adjustable angle from the seat bottom 20, in known manner. The seat bottoms 20 may have an upper surface 26 that extends in the cross-car and fore-aft directions, an inward side 28 near the console 18, and outward side 30 near a door 32 (FIG. 1) or wall of the passenger compartment, a rear side 34 near the seat back 22 and a front side 36 spaced forwardly in the fore-aft direction from the rear side 34. A cross-car width of the seat bottom 20 may be defined between the sides 28 and 30, and a fore-aft length of the seat bottom 20 may be defined between the rear and front sides 34, 36. A front side 38 of each seat back 22 may face forwardly in the fore-aft direction, toward the front side 36 of the seat bottom 20, and the seat back 22 may have an inward side 40 aligned with inward side 28 of the seat bottom 20, an outward side 42 aligned with the outward side 30 of the seat bottom.

Also with reference to FIG. 2, the center console 18 is at least partially between the seats 12, 14 in the cross-car direction and may have a base 43 with a bottom on or adjacent to the vehicle floor, and side walls 44 and adjoining front and rear walls 46, 48 that extend vertically up to an upper end 49. The console 18 may also include or have coupled thereto, one or more arms 50, 52, with two arms 50, 52 in the example shown, that may be coupled to the base 43 for movement relative to the base 43. In at least some implementations, the arms 50, 52 define an upper wall or cover that overlies at least part of the upper end 49 of the base 43, and one or more compartments 54, 56 of the console 18 that are defined at least in part by the base 43 in any desired manner and arrangement. The compartments 54, 56 may be used, by way of non-limiting examples, for storage, may include power or data connections or buttons to actuate a vehicle feature, or other components, as desired. The arms 50, 52 may include cushioned outer surfaces and may support an arm of one or more occupants. However, the arms 50, 52 could be designed without intention of acting as armrests, for example, the arms 50, 52 might include recesses to hold goods like cups, sunglasses or whatever, and may in different applications include rigid instead of cushioned surfaces, as desired.

Figure 4:
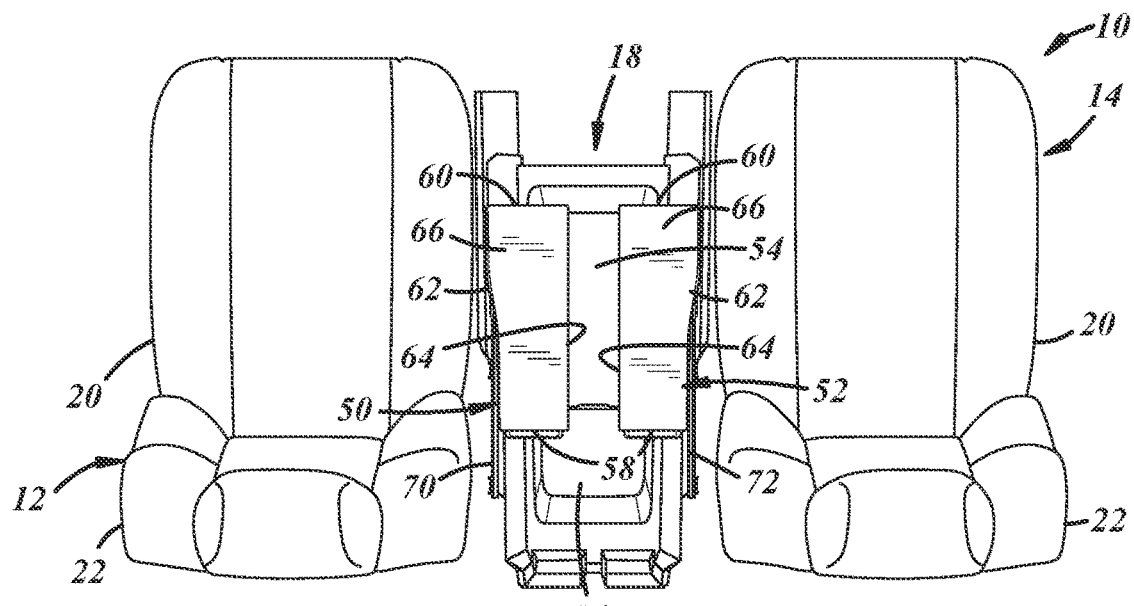
FIG. 4 is a top view showing the seats and console with the arms in an advanced and folded position.

In at least some implementations, two arms 50, 52 are provided. Referring now to FIG. 4, the arms 50, 52 extend in the fore-aft direction from a rear end 58 to a front end 60, in the cross-car direction between opposite sides 62, 64, and they have a thickness in the vertical direction between upper and lower surfaces 66, 68 (lower surface 68 labeled in FIG. 5). The sides 62, 64 may be defined as an inner side 62 closest to the seat 12 or 14 to which an arm 50 or 52 is nearest, and an outer side 64. In this frame of reference, the outer sides 64 of the two arms 50, 52 are adjacent to each other in at least certain positions of the arms, such as those shown in FIGS. 1, 2 and 4.

Figure 3:
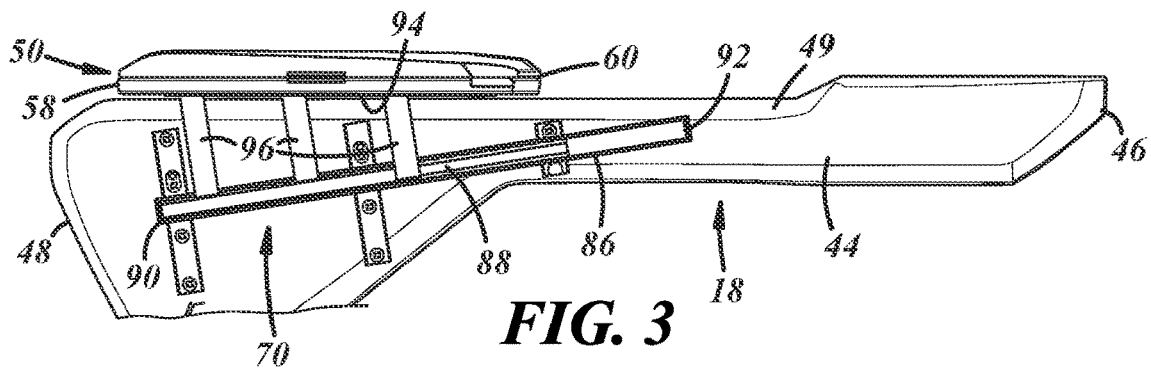
FIG. 3 is a side view of a portion of the console showing one arm in the retracted and folded position.

To increase their utility, the arms 50, 52 may be moved relative to the base 43 among multiple positions. In FIGS. 1-3, the arms 50, 52 are shown in a retracted and folded position. In this position, the arms 50, 52 may be at the same vertical position and arranged side-by-side in the cross-car direction. Also, the rear ends 58 of the arms 50, 52 may be generally aligned with or adjacent to the rear wall 48 of the console 18. In at least some implementations, such as that shown in FIG. 2, the front end 60 of the arms 50, 52 is spaced from the front wall 46 of the base 43, and a portion of the base 43 is exposed forward of the arms 50, 52. This portion of the base 43 may define a first compartment 54 the interior of which is accessible when the arms 50, 52 are retracted as shown.

Figure 5:
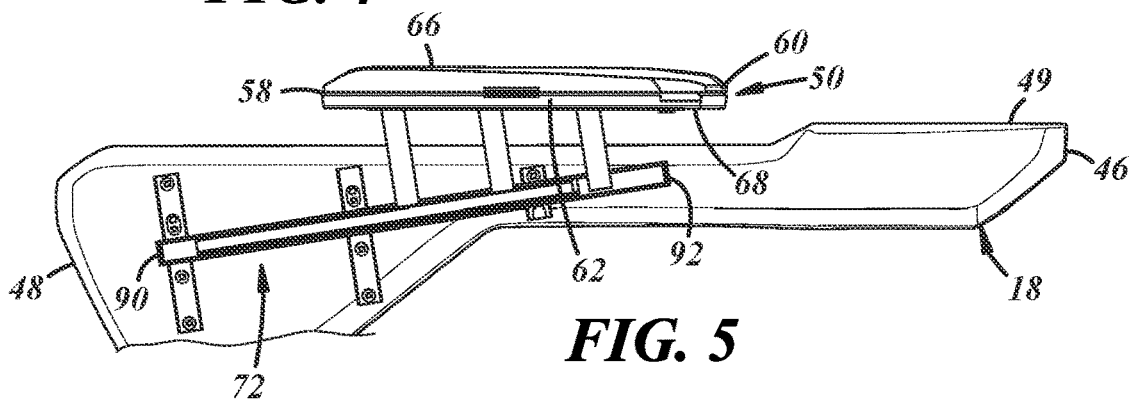
FIG. 5 is a side view of a portion of the console showing one arm in the advanced and folded position.

In FIGS. 4-6, the arms 50, 52 are shown in an advanced and folded position, after the arms 50, 52 have been moved forward from the retracted position, toward the front of the vehicle, in the fore-aft direction. In at least some implementations, the arms 50, 52 are coupled to the base 43 by separate guides or tracks 70, 72, including a first track 70 and a second track 72, that enable slidable movement of the arms 50, 52 along their respective track 70, 72. The coupling of the tracks 70, 72 to the console 18, and the arms 50, 52 to the tracks 70, 72, will be set forth in more detail later. In the advanced position, the front ends 60 of the arms 50, 52 may cover all or part of the first compartment 54, and a second compartment 56 may be exposed behind the rear ends 58 of the arms 50, 52 (where behind is with reference to the fore-aft direction). The first compartment 54 and second compartment 56 may be separate from each other, or open to each other beneath the arms 50, 52, as desired. In the retracted position (FIGS. 1-3) the arms 50, 52 may overlap, in the fore-aft direction, at least part of the seat back 22 of the adjacent seat 12, 14, in at least some positions of the seats, recognizing that vehicle seats are often movable in the fore-aft direction. In at least some implementations, in the advanced position the arms 50, 52 do not overlap the seat back 22 of the adjacent seat 12, 14, regardless of the position of the seat.

Figure 7:
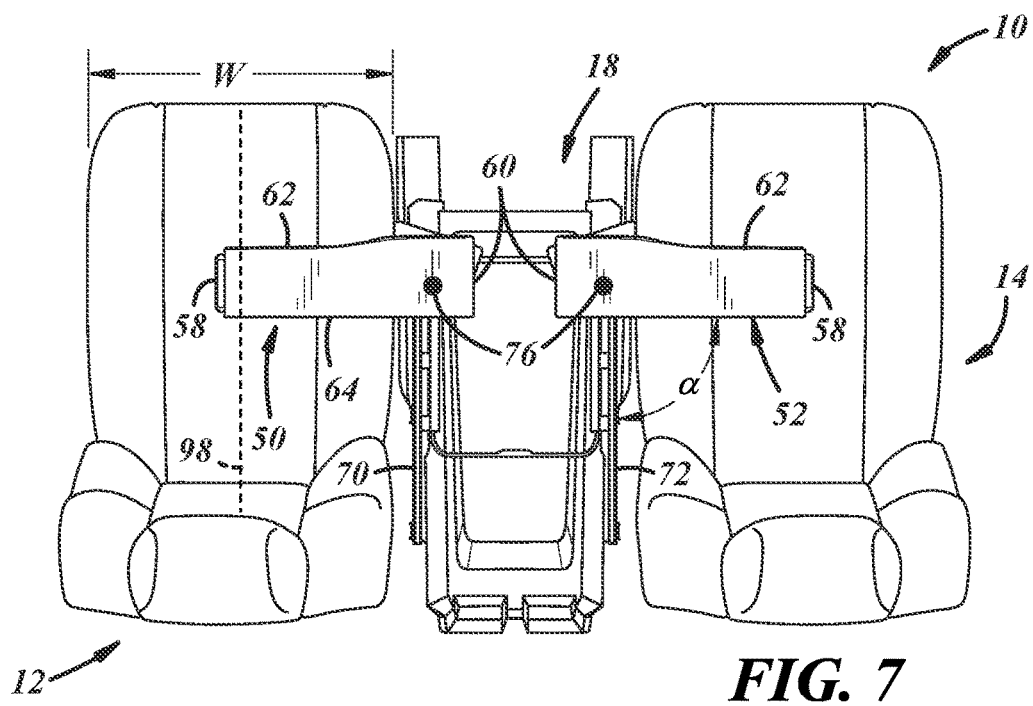
FIG. 7 is a top view showing the seats and console with the arms in an advanced, extended and folded position.
Figure 8:
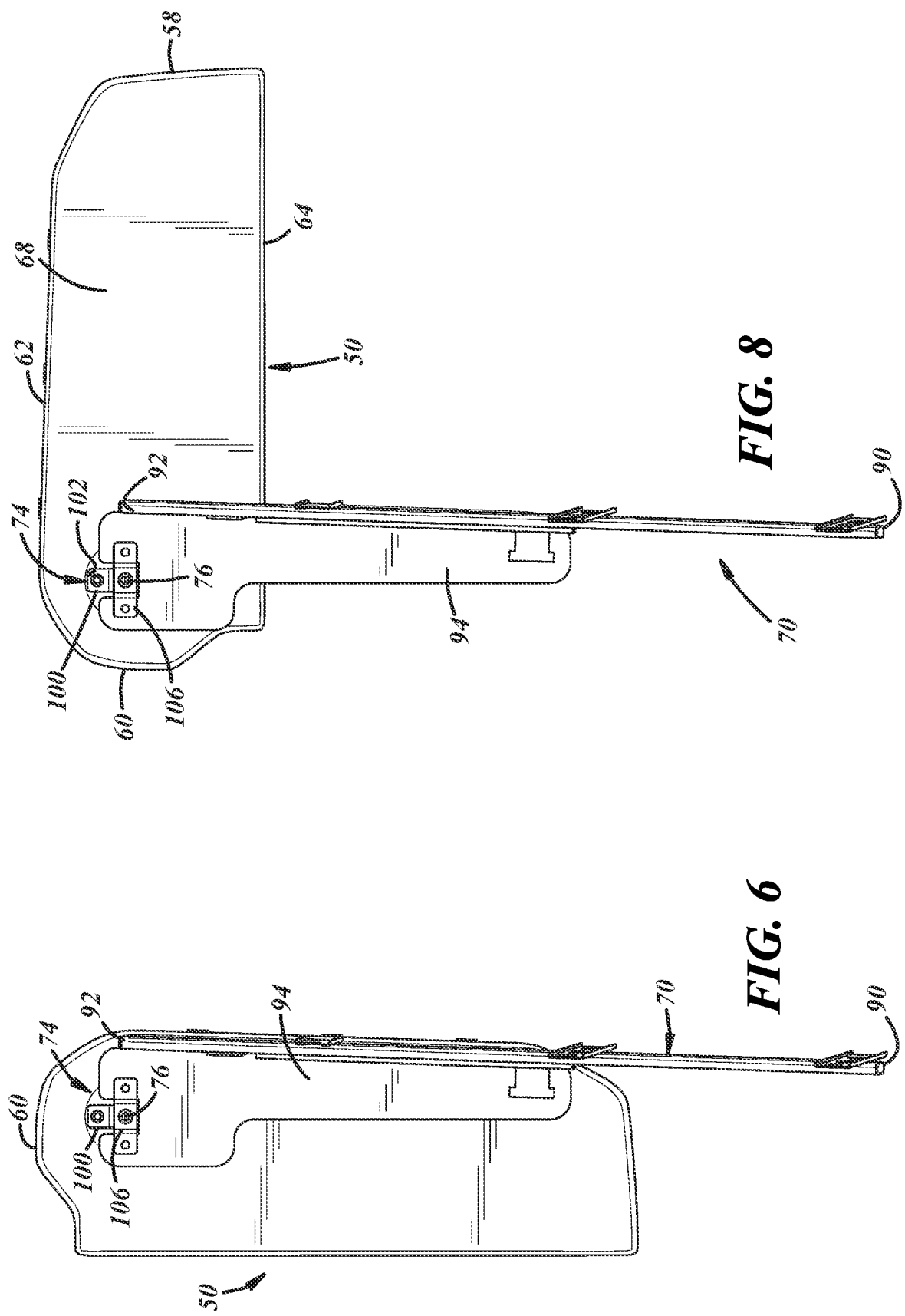
FIG. 8. is a bottom view of an arm and track, showing the arm in the advanced, extended and folded position.

In FIGS. 7 and 8, the arms 50, 52 are shown in: a) the forwardly advanced position (as in FIGS. 4-6); b) an outward position; and c) the folded position. In this position, the arms 50, 52 have been rotated outwardly so that the rear end 58 of each arm 50, 52 overlaps the seat 12 or 14 adjacent to that arm 50, 52. The rotation may occur about pivots 74 at or near the front ends 60 of the arms 50, 52, and the pivots 74 may permit rotation about spaced apart axes 76 oriented in the vertical direction, so that the arms 50, 52 rotate along paths that are parallel to the cross-car and fore-aft directions. The plane of rotation, or path of rotary travel of the arms 50, 52, may be parallel to the upper surface 26 of the seat bottoms 20, or within 20 degrees of parallel to the upper surface 26. When in the outward/rotated position, at least part of the arms 50, 52 are positioned over at least part of the seat bottom 20, and when an occupant is in the seat, over at least part of one or both legs of the occupant.

Figure 9:
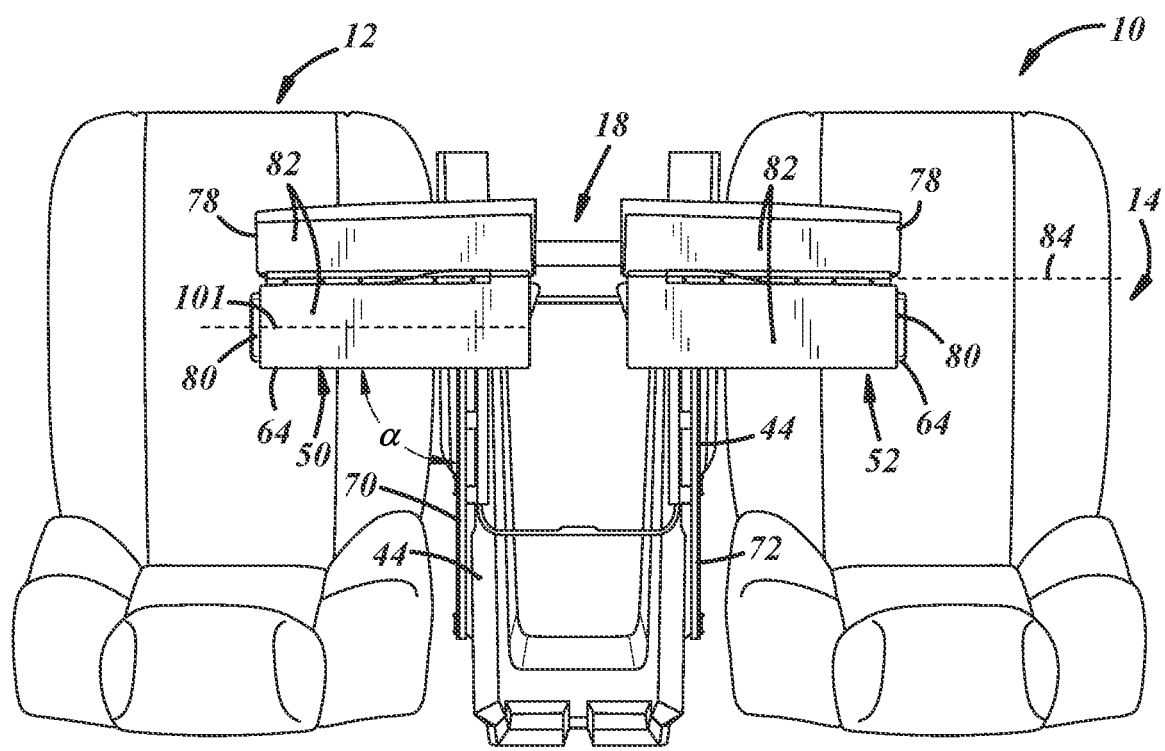
FIG. 9 is a top view showing the seats and console with the arms in an advanced, extended and unfolded position.
Figure 10:
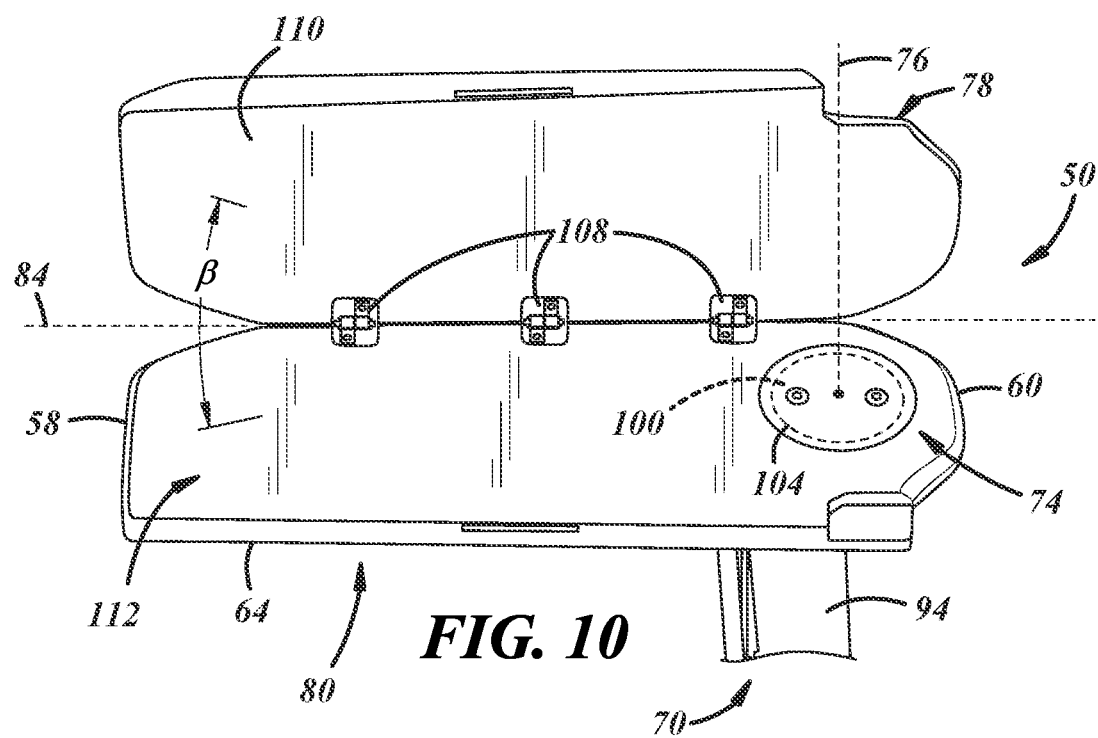
FIG. 10 is a bottom view of an arm and track to which the arm is mounted, showing the arm in the advanced, extended and unfolded position.

In at least some implementations, to facilitate use of the arms 50, 52 by an occupant of the vehicle, the arms 50, 52 may be moved from the folded position to an unfolded position, as shown by comparison of FIG. 4 or 7 with FIGS. 9 and 10. To do this, an upper part 78 of the arms 50, 52 is pivotably coupled to a lower part 80 of the arms, where the lower part 80 of the arms is coupled to the console 18 (e.g. via a track 70, 72). In this way, the upper part 78 of the arms 50, 52 may move relative to the lower part 80 of the arms to provide an upper surface 82 of the arms that is defined by surfaces of both parts 78 and 80 and has an increased surface area. In at least some implementations, the upper part 78 of each arm is coupled to the lower part 80 along a side of the arm 50, 52, such as the outer side 64 between the front end 60 and rear end 58 of the arm, and the axis of rotation 84 of the upper part 78 is parallel to the side 64 of the arm 50, 52, and parallel to the fore-aft and cross-car directions.

With the movement of the arms 50, 52 generally described, certain implementations and features regarding the interconnection of components will be described. FIGS. 2-5, 7 and 9 show the tracks 70, 72 for the two arms 50, 52 coupled to the console 18, along the side walls 44 of the console 18 and near or at the upper end 49 of the console 18. The tracks 70, 72 extend in the fore-aft direction, and in at least some implementations, the tracks 70, 72 permit sliding movement of the arms 50, 52 in the fore-aft direction between the retracted position and the advanced position as noted above and shown by comparison of FIGS. 2 and 3 with FIGS. 4 and 5.

To facilitate further description of the tracks 70, 72, only one track 70 will be referenced but both tracks 70, 72 may be similarly arranged. The track 70 may be constructed to permit relative sliding movement of the arm 50. With reference to FIG. 3, the track 70 may include a base 86 that is fixed to the console 18 and a carriage 88 that is coupled to the arm 50. The carriage 88 may slide along the base 86 or rollers or bearings may be provided between the carriage 88 and base, or other sliding or rolling arrangement may be used to permit the arm 50 to move relative to the console 18, as noted. The arm 50 may be stopped in any desired position between the retracted and advanced positions, and in at least some implementations, the arm will remain in the chosen location unless further moved by an occupant (or an actuator, if the arm is coupled to an actuator like a motor that displaces the arm upon user command).

As best shown in FIGS. 3 and 5, the track 70 may be inclined relative to the upper end 49 of the console 18, and one or both of the lower and upper surfaces 66, 68 of the arm 50. In the implementation shown, a rear end 90 of the track 70 is lower, in the vertical direction, than a front end 92 of the track 70. The arm 50 may be coupled to the track 70 so that the lower surface 68 of the arm 50 is generally parallel with the upper end 49 of the console 18, at least when the arm 50 is in the retracted position (where "generally parallel" means parallel or within ten degrees of parallel). In the implementation shown, a support plate 94 is coupled to or formed as part of the carriage 88 of the track 70 by multiple brackets 96 of varying length, with a bracket closer to the front end 60 of the arm 50 being shorter than a bracket closer to the rear end of the arm. The arm 50, e.g. the lower part 80 of the arm 50, is coupled to the support plate 94 so that the carriage 88, support plate 94 and arm 50 all move relative to the track base 86 and console 18 as the arm 50 moves fore-aft to and between the retracted and advanced positions.

As shown by comparison of FIGS. 3 and 5, due to the inclination of the track 70, the arm 50 may be raised vertically away from the upper end 49 of the console 18 as the arm is moved from the retracted to the advanced position. Among other things, this may help to ensure that the bottom surface 68 of the arm 50 is raised above the level of the legs of an occupant in the associated seat 12, and thereby facilitate pivoted movement of the arm out over the occupant's legs (to or toward the outward position shown in FIG. 7). In an implementation wherein the upper end 49 of the console 18 is suitable high in the vertical direction, the track 70 need not be angled and the arm 50 may move between the retracted and advanced position without being raised in the vertical direction.

FIGS. 6 and 8 further show the connection of the arm 50 to the track 70 to permit pivoted movement of the arm, as shown by comparison of FIGS. 4 and 7. In FIGS. 6 and 8 it can be seen that the support plate 94 is coupled to a pivot 74 that is coupled to the arm 50, where the arm can rotate about the pivot and relative to the support plate. The pivot 74 may be implemented in any desired mechanism that allows the desired rotation of the arm 50 relative to the console 18. As shown, the pivot 74 includes a pivot body 100 that is fixed to the support plate 94 and that is rotatably received in a cavity 102 in the lower part 80 of the arm 50. The pivot body 100 may have a circular perimeter and may be received in a circular cavity 102 formed in or through the lower plate 80 of the arm 50. The arm 50 can rotate about the pivot body 100 and thus, about the support plate 94 and track 70. As best shown in FIG. 10, to maintain the arm 50 coupled to the support plate 94, a retainer 104, which may be a disc as shown, may overlap the pivot body 100 and a portion of the lower part 80 of the arm 50 outboard of the cavity 102. That is, the pivot body 100 may be trapped between the support plate 94 and the retainer 104, or otherwise retained relative to the arm 50, as desired. In at least some implementations, the connection between the arm 50 and the support plate 94 (or track 70) requires a certain force to move the arm 50 about the pivot body 100 so that the arm may be stable in one or more intermediate positions along the path of rotation to the extended position unless acted upon by a sufficiently high force to rotate the arm. This enables the arm 50 to be used in multiple positions, as desired by a user. In one example, a swivel torque hinge 106 (FIGS. 6 and 8) is used to provide the desired connection between the arm 50 and support plate 94, and provide a desired resistance to rotation of the arm 50 about the pivot 74.

In at least some implementations, the arms 50, 52 may pivot outward relative to the console 18 so that at least a portion of a side 62 or 64 of the arms 50,52 is at an angle α of at least 75 degrees, where the angle α is shown in FIG. 9 between a side 44 of the console 18 and an outer side 64 of the arm 50, as shown in FIG. 9. The angle may be measured to a different part of the arms 50, 52, such as but not limited to a centerline 101 (shown in dashed line in FIG. 9) of the arms 50, 52. In at least some implementations, the arms 50, 52 may pivot outward to an angle of at least 90 degrees, and up to 120 degrees relative to the console 18. When coupled to the track 70 as shown, the arms 50, 52 are coupled to the support plate 94 at or near their front end 60 and the rear end 58 of each arm is rotated away from the other arm (the arms 50, 52 rotate in opposite directions about axes 76), and away from the seat back 22, toward the front end of the vehicle to the extended position shown in FIGS. 7-10. As viewed in FIGS. 7-10 the arm 50 on the left side of the console 18 rotates clockwise to its extended position and the arm 52 on the right side of the console 18 rotates counterclockwise to its extended position.

Further, the arms 50, 52 may have a length, between the rear end and front end, that is sufficient to overlap at least one-half of the cross-car dimension W (e.g. width) of the adjacent seat when the arms 50, 52 are in their outwardly extended position, as shown in FIG. 7-10. In FIG. 7, dashed line 98 represents a centerline of seat bottom 20 of seat 12, and the arm 50 when in an outward position extends in the cross-car direction beyond the centerline 98 of the seat bottom 20, in at least some implementations. The length of the arms 50, 52, in combination with the amount that they may pivot to their extended positions, facilitates use of the arms 50, 52 as a tray or small table in front of an occupant. In this way, an occupant of a seat 12, 14 can comfortably access objects on the arm while fully seated in the seat, with the occupant's back against the seat back 22 and without having to twist toward the center console 18, such as would be necessary if the arms 50, 52 were shorter or only able to pivot to lesser angle relative to the console 18. Further, the pivoting of the arms 50, 52 about their front ends 60 avoids interference with objects at the front end of the passenger compartment, like a steering wheel 16, dashboard 107 (FIG. 1), gear shifter or the like.

Finally, FIGS. 9 and 10 show the connection between the upper part 78 and the lower part 80 of the arm 50, that permits the arm to move about axis 84 to and between the folded and unfolded positions, like a clamshell. In the implementation shown, multiple hinges 108 are used with a first part of each hinge fixed to the lower part 80 and a second part of each hinge fixed to the upper part 78 of the arm 50. Of course, other rotary or pivoting connections may be used including but not limited to a single hinge or a pivot pin, as desired.

The upper part 78 may be rotated to any desired angle β (labeled in FIG. 10) relative to the lower part 80, such as between 0 and 180 degrees, wherein zero degrees represents the folded position of the arm 80 with an inner surface 110 of the upper part 78 received over an inner surface 112 of the lower part 80, and 180 degrees represents the inner surface 110 of the upper part 78 not overlapping and being generally parallel to the inner surface 112 of the lower part 80. In at least some implementations, the connection between the upper part 78 and the lower part 80 requires a certain force to overcome the resistance of the hinges 108 and move the upper part relative to the lower part so that the upper part may remain in one or more positions between the folded and unfolded positions, as desired. This enables the arm 50 to be used in multiple positions, as desired by a user. In one example, swivel torque hinges are used to provide the desired support of the upper part 78 of the arm 50, and provide a desired resistance to movement of the upper part 78 of the arm relative to the lower part 80.

Detents or other mechanisms may be used to releasably retain the arms 50, 52 in one or more positions. For example, a detent arrangement between the support plate and the arm could be used to define a position of the arms 50, 52 wherein the arms 50, 52 are aligned with their respective support plate and not pivoted outwardly therefrom. This could facilitate returning the arms 50, 52 from the outward position and ensure a desired alignment of the arms 50, 52 when not rotated outwardly. A similar arrangement could define one or more extended positions of the arms 50, 52, after they are pivoted relative to the support plates 94. Similarly, detents or other releasable retainers may be used to hold the upper part 78 of the arms 50, 52 in different positions or stages of being opened/unfolded relative to the lower part 80 of the arms.

What is claimed is:

1. An assembly for a vehicle interior, comprising:
a track having a base with a front end and a rear end spaced from the front end in a first direction, the track also having a carriage coupled to the base for movement of the carriage relative to the base in the first direction;
an arm coupled to the carriage so that the arm and carriage move together relative to the base, the arm being coupled to the carriage for rotation of the arm relative to the carriage about a pivot axis to position the arm at an angle to the first direction of at least 75 degrees, and wherein the arm includes a first part coupled to a second part so that the first part is movable relative to the second part to increase a surface area of the arm, wherein the base is inclined relative to the first direction in a second direction, and wherein the carriage and arm move in the second direction as the carriage and arm move relative to the base in the first direction.

2. The assembly of claim 1 wherein the arm has a front end and a rear end and the arm is coupled to the carriage adjacent to the front end so that the arm rotates about the front end and the rear end of the arm rotates away from the carriage.

3. The assembly of claim 1 wherein the arm includes a front end and a rear end and opposite sides that extend between the front end and the rear end, and wherein the first part is attached to the second part along one of the sides to permit pivoted movement of the first part relative to the second part.

4. The assembly of claim 3 wherein the second part is coupled to the carriage and the first part is directly coupled to the second part but is not directly coupled to the carriage.

5. The assembly of claim 3 wherein the first part rotates between folded and unfolded positions relative to the second part and wherein, in the folded position, an inner surface of the first part overlaps and is parallel to an inner surface of the second part, and in the unfolded position, the inner surface of the first part does not overlap the inner surface of the second part.

6. The assembly of claim 5 wherein, in the unfolded position, the first part may be rotated relative to the second part between 90 and 180 degrees from the folded position.

7. The assembly of claim 1 wherein the the first direction is a fore-aft direction and the second direction is a vertical direction that is perpendicular to the fore-aft direction, and wherein the carriage and arm move in the second direction as the carriage and arm move relative to the base in the first direction.

8. The assembly of claim 1 wherein the arm rotates relative to the carriage about the pivot axis to position the arm at an angle to the first direction of at least 90 degrees.

9. A vehicle, comprising:
a first seat including a seat bottom having a width in a cross-car direction and a length in a fore-aft direction that is perpendicular to the cross-car direction;
a console located adjacent to the first seat in the cross-car direction, the console having an upper end and a sidewall adjacent to the first seat and extending in a vertical direction to the upper end, where the vertical direction is perpendicular to the cross-car direction and the fore-aft direction;
a first track coupled to the sidewall of the console, with a rear end of the first track being lower in the vertical direction than a front end of the first track;
a first arm coupled to the first track, the first arm being slidably movable in the fore-aft direction relative to at least part of the first track, the first arm being pivotably movable to an outward position relative to at least part of the first track about a first axis perpendicular to the fore-aft direction and the cross-car direction so that the first arm extends across at least half the width of the seat bottom.

10. The vehicle of claim 9 which also includes:
a second seat arranged so that the console is between the first seat and second seat in the cross-car direction;
a second track coupled to the console;
a second arm coupled to the second track, the second arm being slidably movable in the fore-aft direction relative to at least part of the second track, the second arm being pivotably movable to an outward position relative to at least part of the second track about a second axis perpendicular to the fore-aft direction and the cross-car direction so that a side of the second arm is at an angle of at least 75 degrees relative to the fore-aft direction, and wherein, in the outward position of the second arm, the second arm extends across at least half the width of the second seat.

11. The vehicle of claim 10 wherein the first arm rotates about the first axis in a first direction to the outward position of the first arm, and the second arm rotates about the second axis in a second direction to the outward position of the second arm.

12. The vehicle of claim 9 wherein the arm includes a front end and a rear end, the front end and rear end being aligned in the fore-aft direction in at least one position of the first arm, and wherein the first arm is coupled to the first track at or adjacent to the front end of the first arm, and when the first arm rotates about the first axis, the rear end of the arm rotates away from the first track and overlaps the seat bottom of the first seat.

13. The vehicle of claim 12 wherein, in the outward position, at least a portion of a side of the first arm between the front end of the first arm and the rear end of the first arm is parallel to or within 15 degrees of parallel to the cross-car direction.

14. The vehicle of claim 9 wherein the first arm includes a lower part coupled to the track and an upper part coupled to the lower part, and wherein the upper part is movable relative to the lower part along a second axis that is perpendicular to the first axis.

15. The vehicle of claim 14 wherein the second axis is oriented in the cross-car direction or within 15 degrees of the cross-car direction when the first arm is in the outward position.

16. The vehicle of claim 9 wherein the first seat includes a seat back extending vertically beyond the seat bottom at a rear end of the seat bottom, and wherein the seat bottom includes a front end spaced from the rear end in the fore-aft direction, and wherein as the first arm moves in the fore-aft direction away from the rear end of the seat bottom, the first arm is raised vertically to increase the vertical distance between a bottom surface of the first arm and an upper surface of the seat bottom.

17. The vehicle of claim 9 wherein the rear end of the track is vertically lower than an upper surface of the seat bottom.

18. The vehicle of claim 17 wherein the track has a base that is coupled to the console and that extends in the fore-aft direction, and the track has a carriage that is coupled to the base so that the carriage moves relative to the base in the first direction, and the carriage has one or more brackets that extend vertically between the base and the first arm.

19. The vehicle of claim 18 wherein the carriage has multiple brackets with a first bracket closer to the front end being shorter than a second bracket closer to the rear end.

* * * * *